United States Patent
He et al.

(10) Patent No.: US 8,141,081 B2
(45) Date of Patent: Mar. 20, 2012

(54) OPTIMIZED METHODOLOGY FOR DISPOSITIONING MISSED SCHEDULED TASKS

(75) Inventors: Zhengwen He, Rochester, MN (US); William Roy Yonker, Rochester, MN (US); Christopher Zaremba, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 1095 days.

(21) Appl. No.: 12/017,136

(22) Filed: Jan. 21, 2008

(65) Prior Publication Data

US 2009/0187908 A1     Jul. 23, 2009

(51) Int. Cl.
*G06F 9/46* (2006.01)
*G06F 13/00* (2006.01)

(52) U.S. Cl. ........................ 718/102; 711/162
(58) Field of Classification Search .................. 718/102; 711/162
See application file for complete search history.

(56) References Cited

U.S. PATENT DOCUMENTS

| | | | |
|---|---|---|---|
| 5,848,403 A | | 12/1998 | Gabriner et al. |
| 6,578,005 B1 * | | 6/2003 | Lesaint et al. ............... 705/7.14 |
| 6,591,262 B1 * | | 7/2003 | MacLellan et al. ................... 1/1 |
| 7,574,690 B2 * | | 8/2009 | Shah et al. ..................... 717/104 |
| 7,827,560 B2 * | | 11/2010 | Bayer ............................ 718/107 |

OTHER PUBLICATIONS

"Job Scheduling with Quartz," IBM website, 8 pages, Nov. 21, 2006.
Power Point Presentation entitled Scheduling Algorithms (or the Process of Choosing the Best Job to Run) , 2002.
"Feedback-Controlled Server for Scheduling Aperiodic Tasks," Shinpei Kato, Jul. 2007.

* cited by examiner

*Primary Examiner* — Jennifer To
*Assistant Examiner* — Brian Chew
(74) *Attorney, Agent, or Firm* — Kunzler Needham Massey & Thorpe

(57) ABSTRACT

The present invention provides for a method and system for the disposition of tasks which failed to run during their originally scheduled time. The determination of whether to run missed or delayed tasks is based on calculated ratios rather than on fixed window sizes. A Lateness Ratio is calculated to determine if the time elapsed between the missed task and the scheduled run time is small enough to still allow a late task to run. A Closeness Ratio is calculated to determine if the next available run time for the missed task is close enough to the next scheduled execution of the task that the missed task will be run in place of the upcoming scheduled task. Each ratio is compared to a user defined ratio limit, so if the calculated ratio does not exceed the limit, then the missed task is executed at the first available opportunity.

6 Claims, 4 Drawing Sheets

OPTIMIZED METHODOLOGY FOR DISPOSITIONING MISSED SCHEDULED TASKS

FIELD OF THE INVENTION

The present invention generally relates to computer systems employing task-based scheduling of various operations. The present invention specifically relates to a method and system operating on a computer system which optimizes the disposition and execution of tasks that failed to execute at an originally scheduled time.

BACKGROUND OF THE INVENTION

Computer systems employing scheduled tasks ideally operate by having each task being executed at its regularly scheduled time, often at predefined intervals. Scheduled tasks may not run at the desired time, however, due to various technical problems with the system such as the failure of an application or a server. Once the system is operational again, however, the application that monitors and executes the scheduled tasks must decide whether to either discard or execute the tasks that failed to run at their scheduled times. The execution of tasks in a timely manner may be critical to the intended operation of the computer system, particularly for systems executing data storage backup software tasks.

The typical solution for determining what to do with unexecuted tasks is to have a policy of either always executing or always ignoring overdue tasks. Another workaround is to execute the overdue tasks only if a defined period of time has not yet elapsed, which provides an additional opportunity for tasks to be executed if such tasks can be executed shortly after their originally scheduled time. Each of these approaches, however, are inefficient and imprecise, and may lead to tasks being executed unnecessarily, or not at all when they are most needed. What is needed in the art is a dynamic way to determine whether to execute missed tasks through a configurable setting.

BRIEF SUMMARY OF THE INVENTION

The present invention provides a new and unique method and system for facilitating the disposition and execution of missed scheduled tasks. In one embodiment of the invention, the determination of whether to run missed tasks is based on ratios rather than on fixed window sizes. A ratio-based calculation has the advantage over fixed window sizes because a ratio-based calculation is more likely to produce an appropriate result regardless of the interval size between the scheduled tasks. Moreover, a ratio can also be configurable so that critical tasks are run even if relatively long delays have occurred.

Additionally, in one embodiment of the present invention, another ratio is defined which is used to determine if the missed task will be executed in place of the next scheduled task. This has the advantage of not allowing additional time to pass before executing the task, which may prevent the wasteful overhead of running back-to-back tasks unnecessarily. Using a ratio-based calculation instead of a fixed window size parameter again provides the advantage of a setting that is appropriate regardless of the scheduled task interval size.

Utilizing ratio-based calculations therefore helps determine whether a missed scheduled task can be executed early or late from its originally scheduled time. Each of these ratio calculations are separately performed during the processing of overdue tasks, allowing a more robust and efficient operation than current task scheduling implementations.

The first ratio calculation is the Lateness Test. This test determines whether the time elapsed between the missed task and the scheduled run time is small enough to still allow a late task to run. This calculation is accomplished by analyzing a ratio rather than a fixed window size. The ratio calculated is referred to as the Lateness Ratio.

The second ratio calculation is the Closeness Test. This test determines whether the next available run time for the missed task is close enough to the next scheduled execution of the task that the missed task will be run in place of the upcoming scheduled task. This calculation is also accomplished by analyzing a ratio rather than a fixed window size. The ratio calculated is referred to as the Closeness Ratio.

To evaluate what action is appropriate for a particular delayed task, the module responsible for handling scheduled tasks calculates the Lateness Ratio and Closeness Ratio values of a delayed task and compares the ratio values to predefined, configurable limits. If the Lateness Ratio is equal or smaller than a predefined limit, then the delayed task is executed. Similarly, if the Closeness Ratio is equal or smaller than a predefined limit, then the delayed task is executed in place of the next regularly scheduled task.

DETAILED DESCRIPTION OF THE INVENTION

Figure 1:
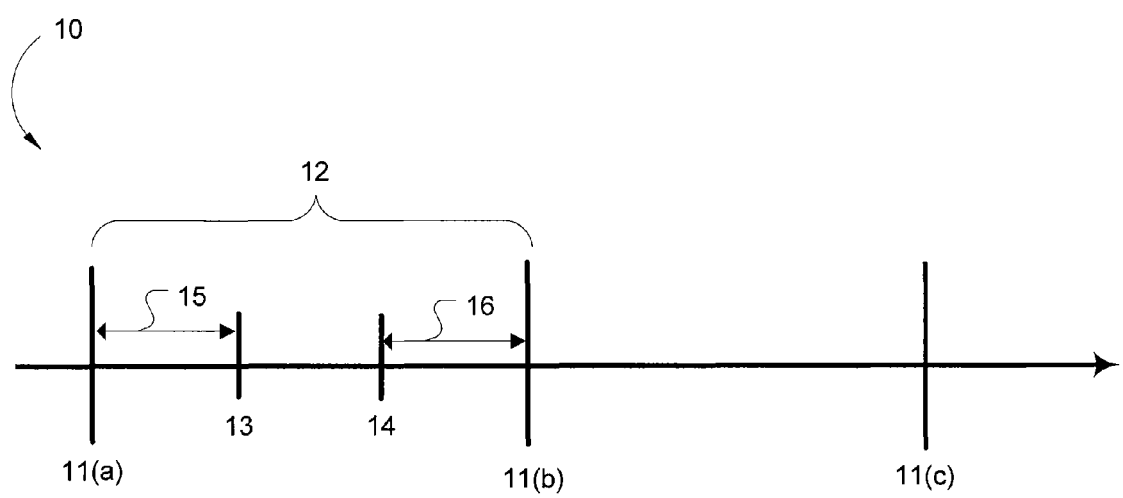
FIG. 1 illustrates a timeline demonstrating an exemplary operating environment of the present invention.

The following terms are defined for purposes of facilitating an understanding of the present invention by those having ordinary skill in the art.

The term "Lateness Ratio" is broadly defined herein as the time lapsed between when a task was originally scheduled to run and when it can be run next (a period further referred to as the "Lateness Period"), divided by the length of the scheduled interval in which the task normally runs. Tasks that are only slightly delayed compared to the desired interval will have a smaller ratio. For example, if tasks are scheduled to run at 4 hour intervals, but task T1 did not run at its scheduled time, and the earliest T1 can run is 1 hour late, this task would have a Lateness Ratio of (1 hour)/(4 hours)=0.25.

The term "Lateness Ratio Limit" is broadly defined herein as the configurable upper limit that calculated Lateness Ratios are compared to. Delayed tasks with Lateness Ratios equal to or smaller than this number are executed. For example, a Lateness Ratio Limit of 0.33 means that a missed task will still be run if less than one third of the time until the next scheduled task execution has elapsed.

The term "Closeness Ratio" is broadly defined herein as the time remaining between when a delayed task can run and the next scheduled time for that task to run (a period further referred to as the "Closeness Period"), divided by the length of the scheduled interval in which the task normally runs. If the execution of the missed task is reasonably close to the next scheduled run time for a task, then it may be desirable to execute the missed task before that next scheduled time to avoid further delay, and then skip the next scheduled task to avoid near back-to-back runs. For example, if tasks are scheduled to run at 5 hour intervals, and task T2 did not run at its scheduled time, and the T2 task can run one hour before its next scheduled execution time, then this task would have a Closeness Ratio of (1 hour)/(5 hours)=0.20.

The term "Closeness Ratio Limit" is broadly defined herein as the configurable upper limit that actual Closeness Ratios are compared to. Delayed tasks with Closeness Ratios smaller than this number are run as soon as possible in place of running the next scheduled task. For example, a Closeness Ratio Limit of 0.33 means that a missed task will be run in substitution of the next scheduled task if less than one third of the time until the next scheduled task execution remains.

The presently disclosed method and system of dispositioning missed tasks allows a dynamic determination of whether to run missed tasks based on ratio calculations rather than on fixed window sizes. A significant advantage of using ratios is that the calculated ratios tend to be meaningful values regardless of the size of the interval between scheduled tasks, whether the interval is as large as once a month or as small as once a minute.

The presently disclosed method and system of dispositioning missed tasks also calculates whether the next scheduled task can be skipped or not, based on a ratio calculation rather than a window size that may not be appropriate as the schedule interval changes. This test allows more robust and efficient task schedule handling when situations prevent tasks from being performed at the desired times.

As depicted in FIG. 1, the timeline 10 contains scheduled task times 11a, 11b, 11c, which are times in which the task is scheduled to normally operate. The interval 12 between 11a and 11b depicts the amount of time which normally elapses between the scheduled task executions. In this example, the task scheduled to execute at time 11a has missed execution or has delayed execution for some various reason.

In FIG. 1, the Lateness Ratio Limit 13 is a point occurring within the interval 12. The Lateness Period 15 is a period of time occurring between the originally scheduled task execution 11a and the Lateness Ratio Limit 13, the Lateness Period 15 representing a range of how late a missed task may be and still be run. The Lateness Ratio is calculated as the length of the Lateness Period 15 divided by the length of the interval 12. This Lateness Ratio is used to determine if the missed task will be executed at the first possibility despite being delayed. Thus, if the Lateness Period has not elapsed, the missed or delayed task will be executed within the Lateness Period 15.

The Closeness Ratio Limit 14 also is a point occurring within the interval 12. The Closeness Period 16 represents how close the run time of a missed task would be as compared to the next scheduled run time of the task. The Closeness Ratio is calculated as the length of the Closeness Period 16 divided by the length of the interval 12. The Closeness Ratio is used to determine if the missed task will run in lieu of running the next task. Thus, if the missed or delayed task 11(a) can be executed within the Closeness Period 16, then this missed or delayed task 11(a) will be executed in lieu of the next scheduled task which would have occurred at time 11(b).

The above-described tests most efficiently apply to tasks that are delayed by less than one schedule interval. If multiple consecutive scheduled times for a task have been missed, it may be more appropriate to have a policy such as running all missed tasks as early as possible.

Other modifications may be made to various embodiments of the present invention to further optimize task execution. If the duration of a task is relatively long compared to the time left before the next scheduled task, there would not be much advantage in starting the task early. Thus, it may be desirable to wait for the next scheduled time rather than bothering to start early. This can be handled by setting the Closeness Ratio Limit to a small value, based upon whether the task is determined to require a long or short execution time. Alternately, if it is important that tasks be executed close to the scheduled times, or not at all, the Lateness Ratio Limit and Closeness Ratio Limit can be set to small values. Small values for the ratio limits would, however, increase the likelihood of missing sample points.

In an implementation of one embodiment of the present invention, it is also possible to establish different rules for different task types. The application handling queued tasks would apply the appropriate limits based on the type of task for each particular queue element. Heterogeneous task types can accordingly be handled with the advantages of ratio-based calculations.

The relationship between the lateness and Closeness Ratio limits may also be modified to further optimize the execution of tasks. Some implementations of the present invention may want to enforce a policy where the Lateness Ratio Limit and Closeness Ratio Limit add up to exactly 1 to ensure all missed tasks are run. Alternatively, a policy may be implemented that requires that the Lateness Ratio Limit and Closeness Ratio Limit add up to 1 or less to avoid the possibility of conflicting rules based on satisfying both limit tests.

The following examples are exemplary implementations of the method and system of the present invention, through the exemplary execution of a data backup task.

Example 1

Figure 2A:
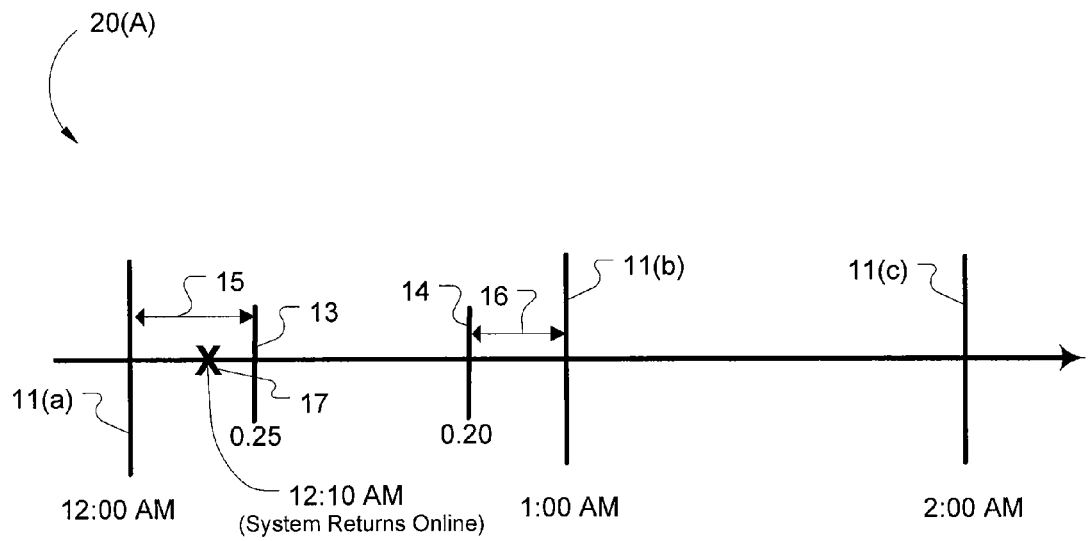
FIG. 2A illustrates a timeline demonstrating an exemplary operation of one embodiment of the present invention.

As depicted in FIG. 2A, Backups 20(A) are scheduled to run hourly on the hour (11(a)-(c)). The user sets the Lateness Ratio Limit 13 to 0.25. Thus, if a problem that prevented a scheduled backup from running at the scheduled time is resolved within the Lateness Period 15, that is, the calculated Lateness Ratio is 0.25 or less, the backup will be run. The user sets the Closeness Ratio Limit 14 to 0.20. If a problem that prevented a scheduled backup from running at the scheduled time is resolved within the Closeness Period 16, that is, the calculated Closeness Ratio is 0.20 or less, then the task will be run in place of the next scheduled task execution 11(b).

The system is down for 15 minutes, from 11:55 PM until 12:10 AM, so the 12:00 AM backup does not occur at its regularly scheduled time. In this scenario, the calculated Lateness Ratio is: (12:10 AM-12:00 AM)/(60 minutes)=10/60=0.17. Once the system returns to operation at 12:10 AM, denoted as Point X 17, because the calculated Lateness Ratio is less than 0.25, the backup task 11(a) will be run. FIG. 2A represents scenarios such as this where the delay for starting the task is considered acceptable.

The Closeness Ratio for this scenario is (1:00 AM-12:10 AM)/(60 minutes)=50/60=0.83. Since this ratio is greater than the Closeness Ratio Limit 14 of 0.20, the delayed running of the backup task does not cause the next scheduled backup to be skipped.

Because the scheduled tasks in the queue may be of different types, it is possible to set different limits for each of the task types. For example, backups of information from System A may be configured to have a Lateness Ratio Limit of 0.8, but backups from System B may be configured to have a Lateness Ratio Limit of 0.5.

Example 2

This example demonstrates how the Lateness Ratio used in the previous example of hourly backups may also be applicable in other scenarios where backups are scheduled at much longer intervals.

Figure 2B:
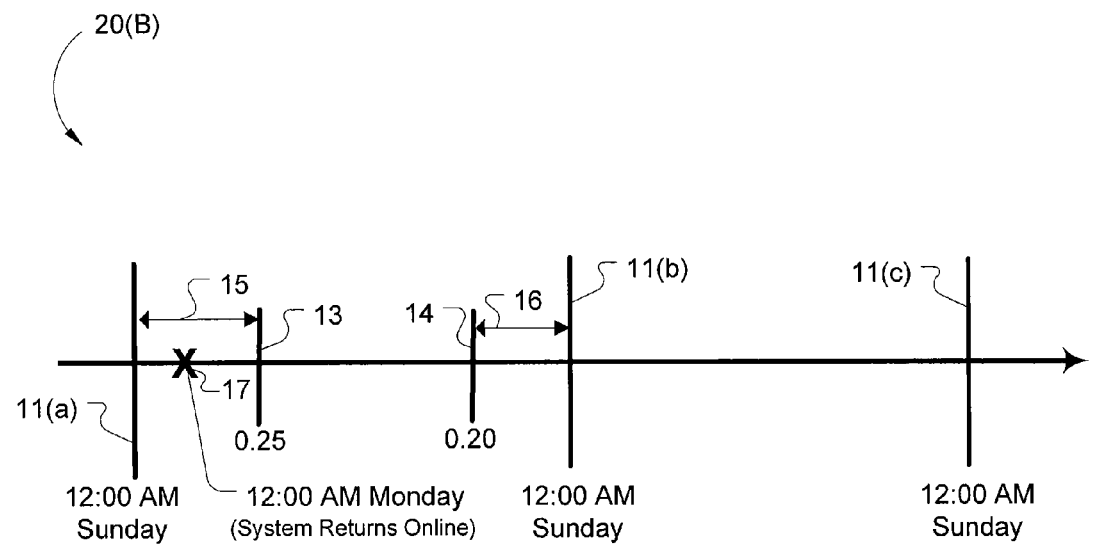
FIG. 2B illustrates a timeline demonstrating an exemplary operation of one embodiment of the present invention.

As depicted in FIG. 2B, Backups 20(B) are scheduled to run weekly at 12:00 AM on Sundays (11(a)-(c)). The user sets the Lateness Ratio Limit 13 to 0.25. Missed backups with a calculated Lateness Ratio of 0.25 or less will be run. The user sets the Closeness Ratio Limit 14 to 0.20. Missed backup 11(a) with a calculated Closeness Ratio of 0.20 or less will be run in place of the next scheduled task execution 11(b).

The system is down for just over 24 hours, from 11:55 PM Saturday until 12:00 AM Monday, so the 12:00 AM Sunday backup does not occur at its regularly scheduled time. In this scenario, the calculated Lateness Ratio is: (12:00 AM Monday-12:00 AM Sunday)/(7×24 hours)=24/168=0.14. Once the system returns to operation at 12:00 AM Monday, denoted as Point X 17, because the calculated Lateness Ratio is less than 0.25, the backup task 11(a) will be run. FIG. 2B represents scenarios such as this where the delay for starting the task is considered acceptable.

The Closeness Ratio for this scenario is (12:00 AM Sunday-12:00 AM Monday)/(7×24 hours)=144 hours/168 hours=0.86. Since this ratio is greater than the Closeness Ratio Limit 14 of 0.20, the delayed running of the backup task does not cause the next scheduled backup to be skipped.

Example 3

Figure 2C:
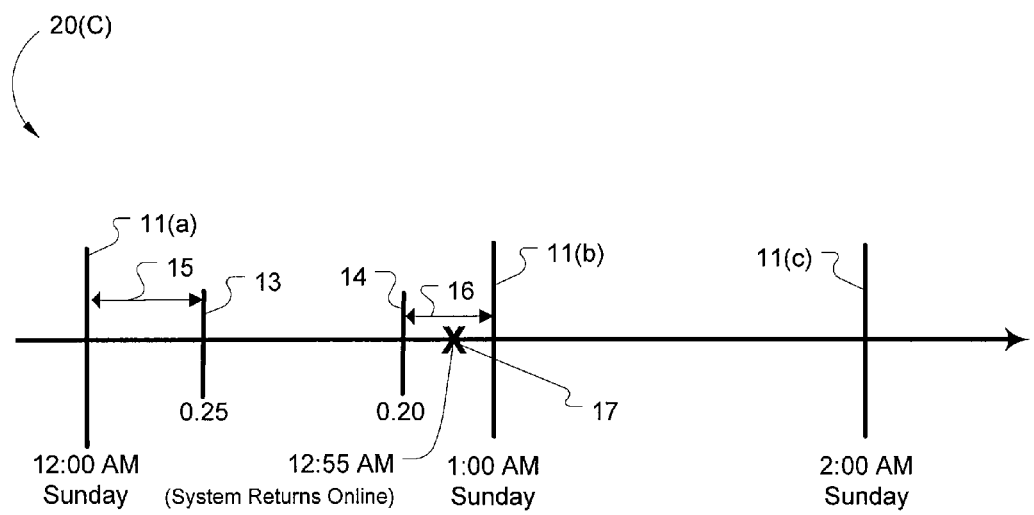
FIG. 2C illustrates a timeline demonstrating an exemplary operation of one embodiment of the present invention.

As depicted in FIG. 2C, Backups 20(C) are scheduled to run hourly on the hour. The user sets the Lateness Ratio Limit 13 to 0.25. Missed backups attempted to be executed in the Lateness Period 15 with a calculated Lateness Ratio of 0.25 or less will be run. The user sets the Closeness Ratio Limit 14 to 0.20. Missed backups attempted to be executed in the Closeness Period 16 with a calculated Closeness Ratio of 0.20 or less will be run in place of the next scheduled task execution 11(b).

The system is down for one hour, from 11:55 PM until 12:55 AM, so the 12:00 AM backup 11(a) did not occur on time. In this example, the calculated Lateness Ratio is (12:55 AM-12:00 AM)/(60 minutes)=0.92. This result is larger than the Lateness Ratio Limit 13, so at this point it has not been established that the missed backup needs to be run.

The Closeness Ratio calculated for this scenario is (1:00 AM-12:55 AM)/60 minutes)=0.08. Since this is less than the Closeness Ratio Limit 14 of 0.20, this backup task 11(a) will be executed at 12:55 AM, and the next scheduled backup 11(b) (1:00 AM) will be skipped. Point X 17 in FIG. 2C is within the Closeness Period 16 and represents scenarios where the delay in task execution brings the next potential start time to within the Closeness Period, close to the next scheduled run time.

Example 4

This example shows how the Closeness Ratio used in the previous example of hourly backups may also be applicable in other scenarios where backups are scheduled at much longer intervals.

Figure 2D:
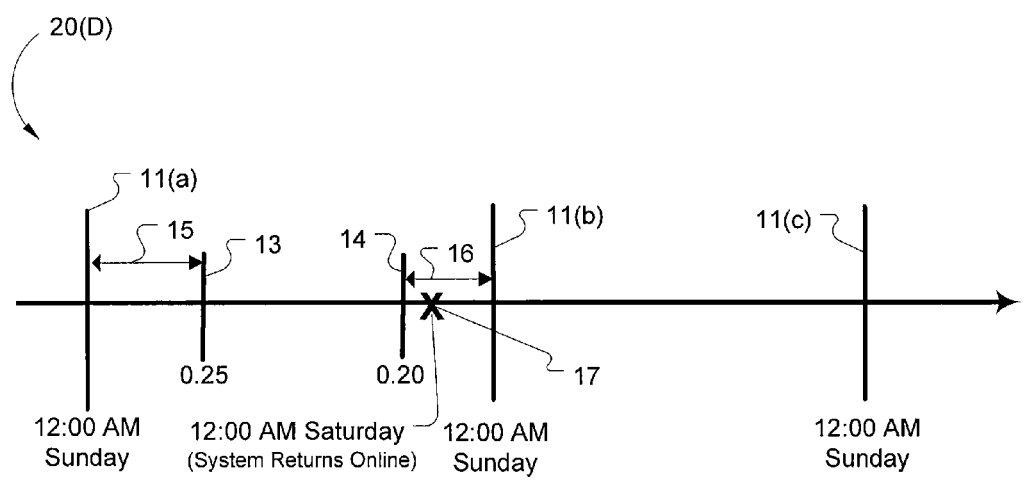
FIG. 2D illustrates a timeline demonstrating an exemplary operation of one embodiment of the present invention.

As depicted in FIG. 2D, Backups 20(D) are scheduled to run weekly at 12:00 AM on Sundays (11(a)-(c)). The user sets the Lateness Ratio Limit 13 to 0.25. Missed backups with a Calculated Lateness Ratio of 0.25 or less will be run. The user sets the Closeness Ratio Limit 14 to 0.20. Missed backups with a calculated Closeness Ratio of 0.20 or less will be run in place of the next scheduled task execution 11(b).

The system is down for just over 6 days, from 11:55 PM Saturday until 12:00 AM the following Saturday, so the 12:00 AM Sunday backup 11(a) does not occur at its regularly scheduled time. In this scenario, the calculated Lateness Ratio is: (12:00 AM Saturday-12:00 AM Sunday)/(12:00 AM Sunday-12:00 AM Sunday)=(6×24 hours)/(7×24)=0.86. This result is larger than the Lateness Ratio Limit 13, so at this point it has not been established that the missed backup needs to be run.

The Closeness Ratio calculated for this scenario is (12:00 AM Sunday-12:00 AM Saturday)/(12:00 AM Sunday-12:00 AM Sunday)=(24 hours)/(24×7)=0.14. Since this is less than the Closeness Ratio Limit 14 of 0.20, this backup task 11(a) will be executed at 12:00 AM Saturday, and the next scheduled backup 11(b) (12:00 AM Sunday) will be skipped. Point X 17 in FIG. 2D is within the Closeness Period 16 and represents scenarios where the delay in task execution brings the next potential start time to within the Closeness Period, close to the next scheduled run time.

Example 5

Figure 2E:
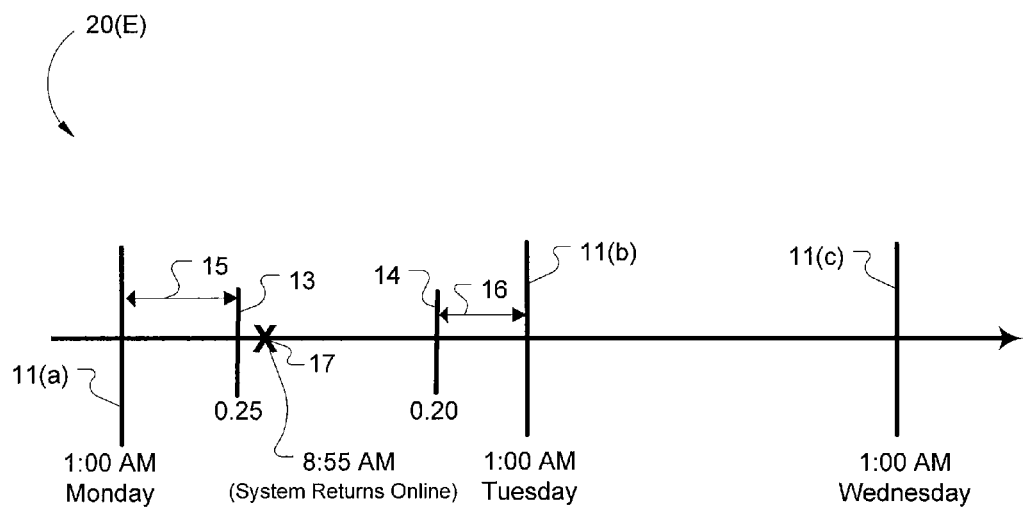
FIG. 2E illustrates a timeline demonstrating an exemplary operation of one embodiment of the present invention.

As depicted in FIG. 2E, Backups 20(E) are scheduled to run daily at 1:00 AM. The user sets the Lateness Ratio Limit 13 to 0.25. Missed backups with a calculated Lateness Ratio of 0.25 or less will be run. The user sets the Closeness Ratio Limit 14 to 0.20. Backup task 11(a) attempted to be executed in the Closeness Period 16 with a calculated Closeness Ratio of 0.20 or less will be run in place of the next scheduled task execution 11(b).

The system is down for nine hours, from 11:55 PM Sunday to 8:55 AM Monday, so the 1:00 AM Monday backup 11(a) did not occur on time. In this example, the calculated Lateness Ratio is (8:55 AM Monday-1:00 AM Monday)/(24 hours)= 7.92/24=0.33. This result is larger than the Lateness Ratio Limit 13, so at this point it has not been established that the missed backup needs to be run.

The Closeness Ratio calculated for this scenario is (1:00 AM Tuesday-8:55 AM Monday)/(24 hours)=16.08/24=0.67. Since the Closeness Ratio is greater than the Closeness Ratio Limit 14 of 0.20, this backup task 11(a) will not be executed in place of the next scheduled backup 11(b) occurring at 1:00 AM Tuesday.

A system returning online at Point X 17 in FIG. 2E represents scenarios such as this where neither the Lateness Ratio Limit or Closeness Ratio Limit conditions have been satisfied, and accordingly the missed backup tasks are not executed.

As previously described, some implementations may enforce a policy where the Lateness Ratio Limit and Closeness Ratio Limit add up to 1. This eliminates the window between the ratio limits 13 and 14 as depicted in FIG. 2E. In other words, all missed backup tasks execute, with the ratio limit calculations used only to determine if the next task will be skipped.

Example 6

Figure 2F:
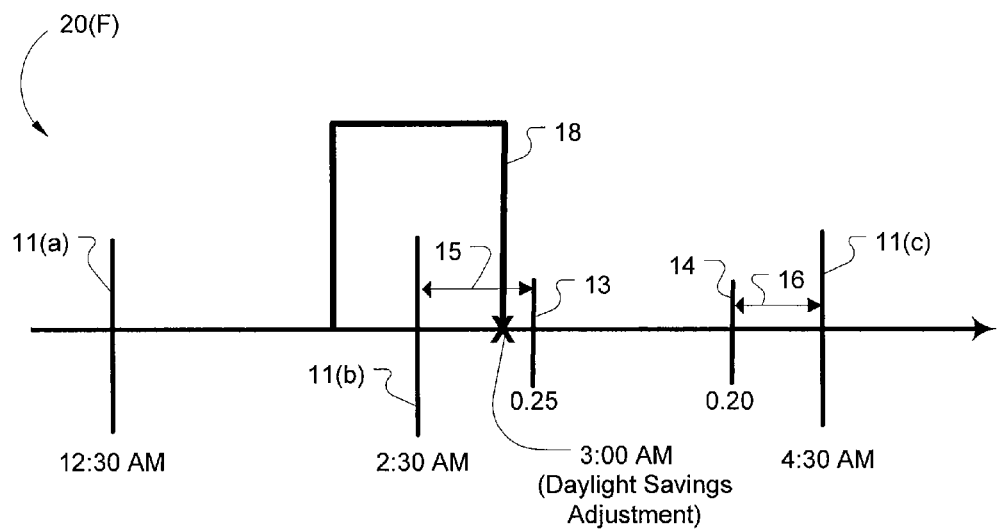
FIG. 2F illustrates a timeline demonstrating an exemplary operation of one embodiment of the present invention.

As depicted in FIG. 2F, Backups 20(F) are scheduled to run every two hours starting at 12:30 AM (11(a)-11(c)). The user sets the Lateness Ratio Limit 13 in this example to 0.25. Missed backups with a calculated Lateness Ratio of 0.25 or less will be run. The user sets the Closeness Ratio Limit 14 to 0.20. Missed backups with a calculated Closeness Ratio of 0.20 or less will be run in place of the next scheduled task execution. Due to Daylight Savings Time, the system clock is moved ahead 18 from 2:00 AM to 3:00 AM, potentially causing the backup task 11(*b*) scheduled for 2:30 AM to be missed.

In this scenario, the Lateness Ratio is calculated as: (3:00 AM-2:30 AM)/(2 hours)=0.5/2=0.25. Since this is less than or equal to 0.25, the backup task 11(*b*) will be run.

To determine if backup task 11(*b*) is executed in place of the next scheduled task 11(*c*), the Closeness Ratio is calculated and compared to the limit. The Closeness Ratio for this scenario is (4:30 AM-3:00 AM)/(2 hours)=1.5/2=0.75. Since this is greater than the Closeness Ratio Limit 14 of 0.20, this delayed running of the backup task 11(*b*) does not cause the next scheduled execution of this backup task 11(*c*) to be skipped.

Although various representative embodiments of this invention have been described above with a certain degree of particularity, those skilled in the art could make numerous alterations to the disclosed embodiments without departing from the spirit or scope of the inventive subject matter set forth in the specification and claims.

What is claimed is:

1. A method in a computer system for dispositioning an execution of a task that failed to execute at an originally scheduled execution time using ratio-based calculations, comprising:
    calculating a lateness ratio by dividing (i) a measurement of time between the originally scheduled execution time of the task and a next available execution time of the task with (ii) a measurement of time between the originally scheduled execution time of the task and a next scheduled execution time of the task;
    calculating a closeness ratio by dividing (i) a measurement of time between the next available execution time of the task and the next scheduled execution time of the task with (ii) the measurement of time between the originally scheduled execution time of the task and the next scheduled execution time of the task;
    executing the task at the next available execution time of the task if the calculated lateness ratio is less than a predefined lateness ratio limit; and
    executing the task at the next available execution time of the task if the calculated closeness ratio is less than a predefined closeness ratio limit, wherein the execution is performed in lieu of the next scheduled execution of the task if the calculated closeness ratio is less than the predefined closeness ratio limit,
    wherein the task contains operations associated with a data backup.

2. The method as described in claim 1, wherein the sum of the predefined lateness ratio limit and the predefined closeness ratio limit equals 1.

3. The method as described in claim 1, wherein the sum of the predefined lateness ratio limit and the predefined closeness ratio limit is less than 1.

4. A system for dispositioning an execution of a task that failed to execute at an originally scheduled execution time using ratio-based calculations, comprising:
    at least one processor; and
    at least one memory storing instructions operable with the at least one processor for providing highly available multiple storage system consistency, the instructions being executed for:
    calculating a lateness ratio by dividing (i) a measurement of time between the originally scheduled execution time of the task and a next available execution time of the task with (ii) a measurement of time between the originally scheduled execution time of the task and a next scheduled execution time of the task;
    calculating a closeness ratio by dividing (i) a measurement of time between the next available execution time of the task and the next scheduled execution time of the task with (ii) the measurement of time between the originally scheduled execution time of the task and the next scheduled execution time of the task;
    executing the task at the next available execution time if the calculated lateness ratio is less than a predefined lateness ratio limit; and
    executing the task at the next available execution time if the calculated closeness ratio is less than a predefined closeness ratio limit, wherein the execution is performed in lieu of the next scheduled execution of the task if the calculated closeness ratio is less than the predefined closeness ratio limit,
    wherein the task contains operations associated with a data backup.

5. The system as described in claim 4, wherein the sum of the predefined lateness ratio limit and the predefined closeness ratio limit equals 1.

6. The system as described in claim 4, wherein the sum of the predefined lateness ratio limit and the predefined closeness ratio limit is less than 1.

\* \* \* \* \*